US010611869B2

(12) United States Patent
Sakurada et al.

(10) Patent No.: US 10,611,869 B2
(45) Date of Patent: Apr. 7, 2020

(54) CURABLE COMPOSITION AND CURED PRODUCT

(71) Applicant: AGC Inc., Chiyoda-ku (JP)

(72) Inventors: Tomoaki Sakurada, Chiyoda-ku (JP); Keisuke Takagi, Chiyoda-ku (JP); Yasuhiro Kuwana, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/366,622

(22) Filed: Mar. 27, 2019

(65) Prior Publication Data

US 2019/0218325 A1    Jul. 18, 2019

Related U.S. Application Data

(63) Continuation of application No. PCT/JP2017/034777, filed on Sep. 26, 2017.

(30) Foreign Application Priority Data

Sep. 28, 2016  (JP) ................. 2016-189906

(51) Int. Cl.
| | | |
|---|---|---|
| C08F 2/46 | (2006.01) | |
| C08F 2/50 | (2006.01) | |
| C08G 61/04 | (2006.01) | |
| C08F 222/20 | (2006.01) | |
| C08F 220/18 | (2006.01) | |
| C08F 222/14 | (2006.01) | |
| C08F 220/30 | (2006.01) | |
| C08F 222/38 | (2006.01) | |
| C08F 220/34 | (2006.01) | |
| C08F 222/10 | (2006.01) | |

(52) U.S. Cl.
CPC .......... C08F 222/20 (2013.01); C08F 220/18 (2013.01); C08F 220/30 (2013.01); C08F 220/34 (2013.01); C08F 220/38 (2013.01); C08F 222/14 (2013.01); *C08F 2220/301* (2013.01); *C08F 2222/102* (2013.01); *C08F 2800/20* (2013.01)

(58) Field of Classification Search
CPC .... C08F 222/20; C08F 222/14; C08F 222/38; C08F 220/18; C08F 220/30; C08F 220/34; C08F 2800/20; C08F 2800/301; C08F 2800/102
USPC ......................................... 522/167, 1; 520/1
See application file for complete search history.

(56) References Cited

U.S. PATENT DOCUMENTS

| | | | |
|---|---|---|---|
| 9,574,106 B2 | 2/2017 | Hayashida et al. | |
| 2011/0236595 A1* | 9/2011 | Kodama | B82Y 10/00 427/553 |
| 2016/0122578 A1 | 5/2016 | Yamaguchi et al. | |
| 2017/0073310 A1* | 3/2017 | Deng | G02B 3/08 |

FOREIGN PATENT DOCUMENTS

| | | |
|---|---|---|
| JP | 2008-94987 | 4/2008 |
| JP | 2010-37470 | 2/2010 |
| JP | 2012-82387 | 4/2012 |
| JP | 2012-233113 | 11/2012 |
| JP | WO2013/047524 | 4/2013 |
| JP | WO2014/196381 | 12/2014 |
| JP | 2016-27403 | 2/2016 |
| JP | 2016-98248 | 5/2016 |
| WO | WO-2015165089 A1 * | 11/2015 |

OTHER PUBLICATIONS

International Search Report dated Dec. 12, 2017 in PCT/JP2017/034777 filed Sep. 26, 2017 (with English Translation).

* cited by examiner

*Primary Examiner* — Jessica Whiteley
(74) *Attorney, Agent, or Firm* — Oblon, McClelland, Maier & Neustadt, L.L.P.

(57) ABSTRACT

Disclosed herein is a curable composition containing a monomer (A) having at least one crosslinkable group and at least one aromatic ring, a monomer (B) having a fluorene skeleton, a compound (C) having an Abbe number of at most 21, and a polymerization initiator (D), wherein the content of the compound (C) is from 1 to 10 mass % based on 100 mass % of the total content of the monomer (A), the monomer (B) and the compound (C). Curable compositions of this disclosure have low viscosities and produce cured products having a high refractive indices, a low Abbe numbers, high transparencies and high heat resistances.

14 Claims, No Drawings

CURABLE COMPOSITION AND CURED PRODUCT

CROSS-REFERENCE TO RELATED APPLICATIONS

This application is a Continuation of PCT/JP2017/034777, which was filed on Sep. 26, 2017. This application is based upon and claims the benefit of priority to Japanese Application No. 2016-189906, which was filed on Sep. 28, 2016.

TECHNICAL FIELD

The present invention relates to a curable composition and a cured product formed by curing the curable composition.

BACKGROUND ART

A cured product formed by curing a curable composition has such merits that (i) by an imprinting method, an injection molding method or the like, it is possible to form a cured product of a variety of shapes from a curable composition in a short time, that (ii) it is less likely to break as compared with glass and that (iii) it is light in weight as compared with glass, and thus, it has attracted attention as a material for optical members in place of glass.

As a camera lens to be mounted on e.g. a mobile phone, which is required to be downsized, a wafer level lens has been used. A wafer level lens is required to have a high refractive index, a low Abbe number, high transparency and high heat resistance. Accordingly, a curable composition for forming such a wafer level lens is required to provide a cured product having a high refractive index, a low Abbe number, high transparency and high heat resistance.

As a curable composition from which a cured product having a high refractive index and high transparency is obtained, for example, the following (1) has been proposed.

(1) A curable composition containing a monomer having a fluorene skeleton and a monomer having a biphenyl skeleton (Patent Documents 1 and 2).

As a curable composition from which a cured product having a high refractive index and a low Abbe number is obtained, for example, the following (2) to (4) have been proposed.

(2) A curable composition containing a monomer having a fluorene skeleton, a monomer having no fluorene skeleton and a polymerization initiator (Patent Document 3).

(3) A curable composition containing a monomer having a bisphenyl sulfide skeleton or the like and a monomer having a fluorene skeleton (Patent Document 4).

(4) A curable composition containing a monomer having a carbazole skeleton and a monomer having a fluorene skeleton (Patent Documents 5).

PRIOR ART DOCUMENTS

Patent Documents

Patent Document 1: JP-A-2008-094987
Patent Document 2: JP-A-2012-082387
Patent Document 3: JP-A-2010-037470
Patent Document 4: JP-A-2016-027403
Patent Document 5: WO2013/047524

DISCLOSURE OF INVENTION

Technical Problem

However, a cured product formed by curing the curable composition (1) has a high Abbe number.

A cured product formed by curing each of the curable compositions (2) to (4) has low transparency if it is adjusted to have a sufficiently low Abbe number. Further, since a monomer having a fluorene skeleton has a high viscosity, a curable composition containing it has a high viscosity in many cases. A curable composition having a high viscosity is inferior in handling efficiency at the time of imprinting or injection molding.

The present invention provides a curable composition having a low viscosity, from which a cured product having a high refractive index, a low Abbe number, high transparency and high heat resistance is obtained, and a cured product having a high refractive index, a low Abbe number, high transparency and high heat resistance.

Solution to Problem

The present invention has the following embodiments.
<1> A curable composition comprising:

a monomer (A) (excluding the following monomer (B)) having at least one crosslinkable group and at least one aromatic ring, which may have one or more sulfur atoms not constituting the ring skeleton of the aromatic ring, in which the total proportion of the mass of atoms constituting the ring skeleton of the aromatic ring, the mass of hydrogen atoms bonded to the atoms constituting the ring skeleton of the aromatic ring and the mass of the sulfur atom not constituting the ring skeleton of the aromatic ring is at least 47 mass % based on 100 mass % of one monomer molecule, and which has a viscosity at 25° C. of at most 1,000 m Pa·s, a monomer (B) represented by the following formula (I), a compound (C) (excluding the monomer (A)) having an Abbe number of at most 21 as obtained from the following formula (II), and a polymerization initiator (D), wherein the content of the compound (C) is from 1 to 10 mass % based on 100 mass % of the total content of the monomer (A), the monomer (B) and the compound (C):

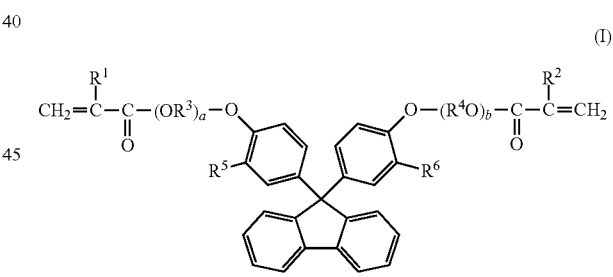

(I)

wherein $R^1$ and $R^2$ are each independently a hydrogen atom or a methyl group, $R^3$ and $R^4$ are each independently at least one member selected from the group consisting of —CH$_2$—, —CH$_2$CH$_2$—, —CH$_2$CH(CH$_3$)—, —CH$_2$CH$_2$CH$_2$—, —CH$_2$CH(OH)CH$_2$—CH$_2$CH(CH$_2$OH)CH$_2$— and —CH$_2$CH(OR$^7$)CH$_2$—, wherein $R^7$ is a (meth)acryloyl group, $R^5$ and $R^6$ are each independently a hydrogen atom or an alkyl group, "a" and b are an integer of from 0 to 4, and a+b is an integer of from 0 to 4;

$$v_D=(n_D-1)/(n_F-n_C) \quad (II)$$

wherein $v_D$ is an Abbe number, $n_D$ is a refractive index to light having a wavelength of 589 nm at 25° C., $n_F$ is a refractive index to light having a wavelength of 486 nm at 25° C., and no is a refractive index to light having a wavelength of 656 nm at 25° C.

<2> The curable composition according to the above <1>, wherein the monomer (A) is at least one member selected from the group consisting of o-phenylbenzyl (meth)acrylate, m-phenylbenzyl (meth)acrylate, 2-(o-phenylphenoxy)ethyl (meth)acrylate, 2-(m-phenylphenoxy)ethyl (meth)acrylate, o-phenoxybenzyl (meth)acrylate, m-phenoxybenzyl (meth) acrylate, 1-naphthylmethyl (meth)acrylate, 2-naphthylmethyl (meth)acrylate, phenyl vinyl sulfide, phenyl vinyl sulfoxide, benzylthio (meth)acrylate, dimethyl naphthyl vinylsilane, (bis(4-methacryloylphenyl) sulfide, 2-(phenylthio)ethylthio (meth)acrylate, bis[4-(meth)acryloyloxyethylthio)phenyl] sulfide and bis[m-(2-(meth)acryloylethoxy) phenoxy] diphenylsilane.

<3> The curable composition according to the above <1> or <2>, wherein the compound (C) is at least one member selected from the group consisting of bis(4-(meth)acryloylthiophenyl) sulfide, 9-vinylcarbazole, 1-vinylnaphthalene, 2-vinylnaphthalene, 2-(9-carbazoyl)ethyl (meth)acrylate, bis(4-vinylthiophenyl) sulfide, acenaphthylene, 9-phenylcarbazole, naphthalene, poly(2-vinylnaphthalene), polyacenaphthylene, poly(9-vinylcarbazole), 4-(2-naphthalenylthio) benzyl acrylate, 2-(2-naphthalenylthio)benzyl acrylate, 5-(2-naphthalenylthio)furfuryl acrylate, 4-(2-benzoxazolylthio)benzyl acrylate, 2-(4-(2-benzothiazolylthio)phenoxy) ethyl acrylate and a polycarbonate having a naphthalene structure.

<4> The curable composition according to any one of the above <1> to <3>, wherein the content of the monomer (A) is from 4 to 90 mass % based on 100 mass % of the total content of the monomer (A), the monomer (B) and the compound (C).

<5> The curable composition according to any one of the above <1> to <4>, wherein the content of the monomer (B) is from 3 to 89 mass % based on 100 mass % of the total content of the monomer (A), the monomer (B) and the compound (C).

<6> The curable composition according to any one of the above <1> to <5>, which further contains an antioxidant (E).

<7> The curable composition according to the above <6>, wherein the addition amount of the antioxidant (E) is from 0.01 to 10 parts by mass based on 100 parts by mass of the total content of the monomer (A), the monomer (B) and the compound (C).

<8> The curable composition according to any one of the above <1> to <7>, which further contains a monomer (F) which is a compound having at least one (meth)acryloyl group (excluding the monomer (A), the monomer (B) and the compound (C)).

<9> The curable composition according to the above <8>, wherein the content of the monomer (F) is from 0 to 5 parts by mass based on 100 parts by mass of the total content of the monomer (A), the monomer (B) and the compound (C).

<10> The curable composition according to any one of the above <1> to <9>, which further contains a solvent in which the monomers (A), (B) and (F), the compound (C), the antioxidant (E) and the polymerization initiator (D) are soluble.

<11> The curable composition according to any one of the above <1> to <10>, which has a viscosity at 25° C. of at most 100,000 mPa·s.

<12> A cured product which is formed by curing the curable composition as defined in any one of the above <1> to <11>.

<13> The cured product according to the above <12>, which has an Abbe number of at most 25 as obtained from the formula (II), and has an internal transmittance for light having a wavelength of 400 nm per 1 mm thickness of at least 90%.

<14> The cured product according to the above <12> or <13>, which has a refractive index for light having a wavelength of 589 nm of at least 1.60.

Advantageous Effects of Invention

According to the curable composition of the present invention, a cured product having a high refractive index, a low Abbe number, high transparency and high heat resistance is obtained. Further, the curable composition of the present invention has a low viscosity.

The cured product of the present invention has a high refractive index, a low Abbe number, high transparency and high heat resistance.

DESCRIPTION OF EMBODIMENTS

The following definition of terms and the manner of description are applied to this specification and claims.

A monomer represented by the formula (A-1) will sometimes be referred to as monomer (A-1). The same applies to other monomers represented by other formulae.

A compound represented by the formula (C-1) will sometimes be referred to as compound (C-1). The same applies to compounds represented by other formulae.

A "monomer" means a compound having a crosslinkable group (such as an ethylenic double bond).

"Atoms constituting the ring skeleton of the aromatic ring" mean only atoms bonded in a ring form, not including hydrogen atoms and substituents bonded to the atoms. For example, the atoms constituting the ring skeleton of the aromatic ring mean, in the case of a benzene ring, only carbon atoms constituting the ring skeleton, and in the case of a heterocyclic ring, only carbon atoms and a hetero atom (such as an oxygen atom, a nitrogen atom or a sulfur atom) constituting the ring skeleton.

The "Abbe number" is the Abbe number $v_D$ as obtained from the following formula (II), unless otherwise specified.

$$v_D = (n_D - 1)/(n_F - n_C) \qquad (II)$$

wherein $n_D$ is the refractive index to light having a wavelength of 589 nm at 25° C., $n_F$ is the refractive index to light having a wavelength of 486 nm at 25° C., and $n_C$ is the refractive index to light having a wavelength of 656 nm at 25° C.

A "(meth)acryloyl group" is a general term for an acryloyl group and a methacryloyl group.

A "(meth)acrylate" is a general term for an acrylate and a methacrylate.

A "light" is a general term for ultraviolet light, visible light, infrared light, electron beam and radiation.

<Curable Composition>

The curable composition of the present invention comprises, as essential components, a monomer (A), a monomer (B), a compound (C) and a polymerization initiator (D).

The curable composition of the present invention may contain an antioxidant (E), a monomer (F), additives, a solvent, etc., as the case requires.

The viscosity at 25° C. of the curable composition of the present invention is preferably at most 100,000 mPa·s. When the viscosity is at most the upper limit value of the above range, the handling efficiency of the curable composition will be good, and it is possible to easily contact the curable composition to an imprinting mold or to easily inject it into an injection molding mold. The viscosity is preferably at most 50,000 mPa·s, more preferably at most 20,000 mPa·s. The lower limit value of the viscosity of the curable composition is not particularly limited, however, when it is at least 10 mPa·s for example, the curable composition can easily be applied to the surface of a substrate without the curable composition flowing out of the surface of the substrate. The viscosity is preferably at least 50 mPa·s, more preferably at least 100 mPa·s.

(Monomer (A))

The monomer (A) is a monomer having at least one crosslinkable group and at least one aromatic ring (excluding the monomer (B)).

The crosslinkable group of the monomer (A) is preferably a group having an ethylenic double bond in view of the crosslinkability with the monomer (B). The group having an ethylenic double bond may, for example, be a (meth)acryloyl group, an allyl group or a vinyl group, and in view of high crosslinkability, preferably a (meth)acryloyl group or a vinyl group.

The aromatic ring of the monomer (A) may, for example, be a benzene ring, a pyrrole ring, a furan ring, a thiophene ring, a pyridine ring, an imidazole ring, a pyrazole ring, an oxazole ring, a thiazole ring, an imidazoline ring, a pyrazine ring, a thiazine ring, a naphthalene ring, an anthracene ring, an indole ring, an isoindole ring, a benzimidazole ring, a purine ring, a quinoline ring, an isoquinoline ring, a quinoxaline ring, a cinnoline ring, a benzothiophene ring, or one having two or more of such rings condensed.

The monomer (A) may have one or more sulfur atoms not constituting the ring skeleton of the aromatic ring, so as to lower the Abbe number. The valence of the sulfur atom of the monomer (A) is preferably bivalent, tetravalent or hexavalent, and is particularly preferably bivalent or tetravalent in view of high atomic dispersion.

In the monomer (A), the total proportion (X) of the mass of the atoms constituting the ring skeleton of the aromatic ring, the mass of hydrogen atoms bonded to the atoms constituting the ring skeleton of the aromatic ring and the mass of the sulfur atom not constituting the ring skeleton of the aromatic ring is at least 47 mass % based on 100 mass % of one monomer molecule. When the proportion (X) is at least 47 mass %, the proportion of the aromatic ring and atoms with high atomic dispersion such as the sulfur atom is high, whereby the Abbe number of the monomer (A) can be lowered. The proportion (X) is preferably at least 50 mass %, more preferably at least 53 mass %, further preferably at least 57 mass %. The proportion (X) is preferably at most 80 mass %, more preferably at most 75 mass %, with a view to maintaining the crosslinkability by the crosslinkable group.

The viscosity of the monomer (A) at 25° C. is at most 1,000 mPa·s. When the viscosity is at most the upper limit value of the above range, the viscosity of the curable composition can be lowered. The viscosity of the monomer (A) is preferably at most 750 mPa·s, more preferably at most 500 mPa·s. The lower limit value of the viscosity of the monomer (A) is not particularly limited, however, when it is at least 1 mPa·s for example, a curable composition having good coating property can be obtained. The viscosity is preferably at least 5 mPa·s, more preferably at least 15 mPa·s.

As the monomer (A), the following compounds may be mentioned.

o-phenylbenzyl (meth)acrylate (X: 64.3 mass %, viscosity: 27 mPa·s), m-phenylbenzyl (meth)acrylate (X: 64.3 mass %, viscosity: 25 mPa·s), a mixture of o-phenylbenzyl (meth)acrylate and p-phenylbenzyl (meth)acrylate (X: 64.3 mass %), 2-(o-phenylphenoxy)ethyl (meth)acrylate (X: 57.1 mass %, viscosity: 150 mPa·s), 2-(m-phenylphenoxy)ethyl (meth)acrylate (X: 57.1 mass %, viscosity: 160 mPa·s), a mixture of 2-(o-phenylphenoxy)ethyl (meth)acrylate and 2-(p-phenylphenoxy)ethyl (meth)acrylate (X: 57.1 mass %), o-phenoxybenzyl (meth)acrylate (X: 60.2 mass %, viscosity: 12 mPa·s), m-phenoxybenzyl (meth)acrylate (X: 60.2 mass %, viscosity: 15 mPa·s), a mixture of m-phenoxybenzyl (meth)acrylate and p-phenoxybenzyl (meth)acrylate (X: 60.2 mass %), 1-naphthylmethyl (meth)acrylate (X: 59.9 mass %, viscosity: 95 mPa·s), 2-naphthylmethyl (meth)acrylate (X: 59.9 mass %, viscosity: 120 mPa·s), phenyl vinyl sulfide (X: 80.1 mass %, viscosity: 1 mPa·s), phenyl vinyl sulfoxide (X: 71.7 mass %, viscosity: 6 mPa·s), benzylthio (meth)acrylate (59.9 mass %, viscosity: 40 mPa·s), dimethyl naphthyl vinyl silane (X: 56.8 mass %, viscosity: 20 mPa·s), (bis(4-methacryloylphenyl) sulfide (X: 52.0 mass %, viscosity: 250 mPa·s), 2-(phenylthio)ethylthio (meth)acrylate (X: 59.2 mass %, viscosity: 150 mPa·s), bis[4-(meth)acryloyloxyethylthio)phenyl] sulfide (X: 56.1 mass %, viscosity: 460 mPa·s), bis[m-(2-(meth)acryloylethoxy)phenoxy] diphenylsilane (X: 54.3 mass %, viscosity: 850 mPa·s).

As the monomer (A), among them, preferred is o-phenylbenzyl (meth)acrylate, m-phenylbenzyl (meth)acrylate, a mixture of o-phenylbenzyl (meth)acrylate and p-phenylbenzyl (meth)acrylate, 2-(o-phenylphenoxy)ethyl (meth)acrylate, 2-(m-phenylphenoxy)ethyl (meth)acrylate, a mixture of 2-(o-phenylphenoxy)ethyl (meth)acrylate and 2-(p-phenylphenoxy)ethyl (meth)acrylate, o-phenoxybenzyl (meth)acrylate, m-phenoxybenzyl (meth)acrylate, a mixture of m-phenoxybenzyl (meth)acrylate and p-phenoxybenzyl (meth)acrylate, 1-naphthylmethyl (meth)acrylate, 2-naphthylmethyl (meth)acrylate or 2-(phenylthio)ethylthio (meth)acrylate.

Commercial products of the monomer (A) may be A-LEN-10 manufactured by Shin-Nakamura Chemical Co., Ltd. EKZ-948 manufactured by DIC Corporation, TO-1463 manufactured by TOAGOSEI CO., LTD., POB-A manufactured by Kyoeisha Chemical Co., Ltd. etc. The monomer (A) may be used alone or in combination of two or more.

(Monomer (B))

The monomer (B) is a monomer represented by the following formula (I):

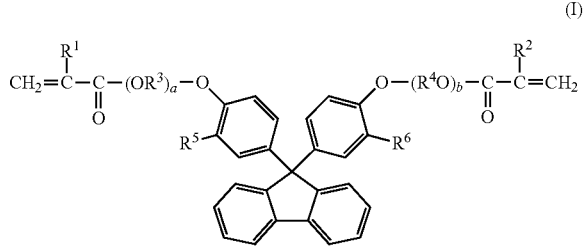

$R^1$ and $R^2$ are each independently a hydrogen atom or a methyl group.

$R^3$ and $R^4$ are each independently at least one member selected from the group consisting of —CH$_2$—, —CH$_2$CH$_2$—, —CH$_2$CH(CH$_3$)—, —CH$_2$CH$_2$CH$_2$—, —CH$_2$CH(OH)CH$_2$—CH$_2$CH(CH$_2$OH)CH$_2$— and —CH$_2$CH(OR$^7$)CH$_2$—, wherein $R^7$ is a (meth)acryloyl group. $R^3$ and $R^4$ are preferably at least one member selected from the group consisting of —CH$_2$CH$_2$—, —CH$_2$CH(OH)CH$_2$—, —CH$_2$CH(CH$_2$OH)CH$_2$— and —CH$_2$CH(OR$^7$)CH$_2$—, particularly preferably —CH$_2$CH$_2$—. When "a" is 1, $R^3$ is only one type, and when "a" is 2 or more, $R^3$ may be one type or may be two or more types. When b is 1, $R^4$ is only one type, and when b is 2 or more, $R^4$ may be only one type or may be two or more types.

$R^5$ and $R^6$ are each independently a hydrogen atom or an alkyl group. The alkyl group is preferably a methyl group, an ethyl group or a propyl group. $R^5$ and $R^6$ are particularly preferably a hydrogen atom.

"a" and b are each independently an integer of from 0 to 4, and a+b is an integer of from 0 to 4. "a" and b are preferably 1 or 2, particularly preferably 1.

As the monomer (B), the following compounds may be mentioned.

9,9-bis(4-(meth)acryloyloxyphenyl)fluorene, 9,9-bis(4-(meth)acryloyloxymethoxyphenyl)fluorene, 9,9-bis(4-(2-(meth)acryloyloxyethoxy)phenyl)fluorene, 9,9-bis(4-(2-(meth)acryloyloxypropoxy)phenyl)fluorene, 9,9-bis(4-(3-(meth)acryloyloxypropoxy)phenyl)fluorene, 9,9-bis(4-(meth)acryloyloxydimethoxyphenyl)fluorene, 9,9-bis(4-(meth)acryloyloxydiethoxyphenyl)fluorene, 9,9-bis(4-(meth)acryloyloxydipropoxyphenyl)fluorene, 9,9-bis(4-(meth)acryloyloxytrimethoxyphenyl)fluorene, 9,9-bis(4-(meth)acryloyloxytriethoxyphenyl)fluorene, 9,9-bis(4-(meth)acryloyloxytripropoxyphenyl)fluorene, 9,9-bis(4-(meth)acryloyloxy-3-methylphenyl)fluorene, 9,9-bis(4-(meth)acryloyloxymethoxy-3-methylphenyl)fluorene, 9,9-bis(4-(2-(meth)acryloyloxyethoxy)-3-methylphenyl) fluorene, 9,9-bis(4-(2-(meth)acryloyloxypropoxy)-3-methylphenyl)fluorene, 9,9-bis(4-(3-(meth)acryloyloxypropoxy)-3-methylphenyl)fluorene, 9,9-bis(4-(meth)acryloyloxydimethoxy-3-methylphenyl)fluorene, 9,9-bis(4-(meth)acryloyloxydiethoxy-3-methylphenyl)fluorene, 9,9-bis(4-(meth)acryloyloxydipropoxy-3-methylphenyl)fluorene, 9,9-bis(4-(meth)acryloyloxytrimethoxy-3-methylphenyl)fluorene, 9,9-bis(4-(meth)acryloyloxytriethoxy-3-methylphenyl)fluorene, 9,9-bis(4-(meth)acryloyloxytripropoxy-3-methylphenyl)fluorene, 9,9-bis(4-(meth)acryloyloxy-3-ethylphenyl)fluorene, 9,9-bis(4-(meth)acryloyloxymethoxy-3-ethylphenyl)fluorene, 9,9-bis(4-(2-(meth)acryloyloxyethoxy)-3-ethylphenyl)fluorene, 9,9-bis(4-(2-(meth)acryloyloxypropoxy)-3-ethylphenyl) fluorene, 9,9-bis(4-(3-(meth)acryloyloxypropoxy)-3-ethylphenyl)fluorene, 9,9-bis(4-(meth)acryloyloxydimethoxy-3-ethylphenyl)fluorene, 9,9-bis(4-(meth)acryloyloxydiethoxy-3-ethylphenyl)fluorene, 9,9-bis(4-(meth)acryloyloxydipropoxy-3-ethylphenyl)fluorene, 9,9-bis(4-(meth)acryloyloxytrimethoxy-3-ethylphenyl)fluorene, 9,9-bis(4-(meth)acryloyloxytriethoxy-3-ethylphenyl)fluorene, 9,9-bis(4-(meth)acryloyloxytripropoxy-3-ethylphenyl)fluorene, 9,9-bis(4-(meth)acryloyloxy-3-propylphenyl)fluorene, 9,9-bis(4-(meth)acryloyloxymethoxy-3-propylphenyl)fluorene, 9,9-bis(4-(2-(meth)acryloyloxyethoxy)-3-propylphenyl)fluorene, 9,9-bis(4-(2-(meth)acryloyloxypropoxy)-3-propylphenyl)fluorene, 9,9-bis(4-(3-(meth)acryloyloxypropoxy)-3-propylphenyl)fluorene, 9,9-bis(4-(meth)acryloyloxydimethoxy-3-propylphenyl)fluorene, 9,9-bis(4-(meth)acryloyloxydiethoxy-3-propylphenyl)fluorene, 9,9-bis(4-(meth)acryloyloxydipropoxy-3-propylphenyl) fluorene, 9,9-bis(4-(meth)acryloyloxytrimethoxy-3-propylphenyl)fluorene, 9,9-bis(4-(meth)acryloyloxytriethoxy-3-propylphenyl)fluorene, 9,9-bis(4-(meth)acryloyloxytripropoxy-3-propylphenyl)fluorene, 9,9-bis(4-(meth)acryloyloxy-(2-hydroxy)propoxyphenyl)fluorene, 9,9-bis(4-(meth)acryloyloxy-(2-hydroxy)propoxy-3-methylphenyl)fluorene, 9,9-bis(4-(meth)acryloyloxy-(2-hydroxy)propoxyethoxyphenyl)fluorene, etc.

As the monomer (B), among them, preferred is 9,9-bis (4-(meth)acryloyloxyphenyl)fluorene, 9,9-bis(4-(meth)acryloyloxymethoxyphenyl)fluorene, 9,9-bis(4-(2-(meth)acryloyloxyethoxy)phenyl)fluorene, 9,9-bis(4-(2-(meth)acryloyloxypropoxy)phenyl)fluorene, 9,9-bis(4-(3-(meth)acryloyloxypropoxy)phenyl)fluorene, 9,9-bis(4-(meth)acryloyloxydimethoxyphenyl)fluorene, 9,9-bis(4-(meth)acryloyloxydiethoxyphenyl)fluorene or 9,9-bis(4-(meth)acryloyloxydipropoxyphenyl)fluorene. Commercial products of the monomer (B) may be EA-0200, EA-0500, EA-1000, etc. manufactured by Osaka Gas Chemicals Co., Ltd., A-BPEF manufactured by Shin-Nakamura Chemical Co., Ltd., etc. The monomer (B) may be used alone or in combination of two or more.

(Compound (C))

The compound (C) is a compound having an Abbe number $v_D$ of at most 21 (excluding the monomer (A)). The compound (C) may have a crosslinkable group or may not have a crosslinkable group.

As specific examples of the compound (C), the following compounds may be mentioned.

Bis(4-(meth)acryloylthiophenyl) sulfide ($v_D$:20.1), 9-vinylcarbazole ($v_D$:16.4), 1-vinylnaphthalene ($v_D$:17.8), 2-vinylnaphthalene ($v_D$:16.4), 2-(9-carbazoyl)ethyl (meth)acrylate ($v_D$:20.3), bis(4-vinylthiophenyl) sulfide ($v_D$:17.5), acenaphthylene ($v_D$:20.8), 9-phenylcarbazole ($v_D$:18.0), naphthalene ($v_D$:19.1), poly(2-vinylnaphthalene) ($v_D$:17.0), polyacenaphthylene ($v_D$:19.0), poly(9-vinylcarbazole) ($v_D$: 17.5), 4-(2-naphthalenylthio)benzyl acrylate ($v_D$:20.1), 2-(2-naphthalenylthio)benzyl acrylate ($v_D$:20.4), 5-(2-naphthalenylthio)furfuryl acrylate ($v_D$:19.6), 4-(2-benzoxazolylthio)benzyl acrylate ($v_D$:20.1), 2-(4-(2-benzothiazolylthio)phenoxy)ethyl acrylate ($v_D$:18.9), a polycarbonate having a naphthalene structure, such as lupizeta (tradename, manufactured by MITSUBISHI GAS CHEMICAL COMPANY, INC.) EP-8000 ($v_D$: 20.5), etc. The compound (C) may be used alone or in combination of two or more.

(Polymerization Initiator (D))

The polymerization initiator (D) is suitably selected depending on the curing method (photo-curing or heat-curing), etc.

As the polymerization initiator (D), a photopolymerization initiator or a thermal polymerization initiator may be mentioned. As the polymerization initiator (D), a photopolymerization initiator is preferred in that it is thereby easy to produce a cured product.

As the photopolymerization initiator, a photoradical polymerization initiator to generate radicals by absorbing light is preferred in that it is thereby easy to produce a cured product.

The photoradical polymerization initiator may be an alkylphenone-type photopolymerization initiator, an acylphosphine oxide-type photopolymerization initiator, a titanocene-type photopolymerization initiator, an oxime ester-type photopolymerization initiator, an oxyphenyl acetic acid ester-type photopolymerization initiator, a benzoin-type photopolymerization initiator, a benzophenone-type photopolymerization initiator, a thioxanthone-type photopolymerization initiator, benzyl-(o-ethoxycarbonyl)-α-monooxime, glyoxy ester, 3-ketocoumarin, 2-ethyl anthraquinone, camphorquinone, tetramethylthiuram sulfide, azobisisobutyronitrile, benzoyl peroxide, a dialkyl peroxide, tert-butyl peroxypivalate, etc. In view of high sensitivity to ultraviolet light (wavelength:250 nm to 380 nm) and high solubility in the curable composition, the photoradical polymerization initiator is preferably an alkylphenone-type photopolymerization initiator, an acylphosphine oxide-type photopolymerization initiator, a benzoin-type photopolymerization initiator or a benzophenone-type photopolymerization initiator.

The photopolymerization initiator may be used alone or in combination of two or more.

The thermal polymerization initiator may be 2,2'-azobisisobutyronitrile, benzoyl peroxide, tert-butyl hydroperoxide, cumene hydroperoxide, di-tert-butyl peroxide, dicumyl peroxide, etc. Among them, 2,2'-azobisisobutyronitrile or benzoyl peroxide is preferred in view of low decomposition temperature.

The thermal polymerization initiator may be used alone or in combination of two or more.

(Antioxidant (E))

The antioxidant (E) is a component which suppresses yellowing of a cured product and improves the initial transmittance of the cured product. The antioxidant (E) may, for example, be a phenol-type antioxidant, a phosphorus-type antioxidant or a sulfur-type antioxidant.

The phenol-type antioxidant may, for example, be methylhydroquinone, 4-methoxyphenol, 2,6-di-tert-butyl-4-hydroxytoluene, triethylene glycol bis(3-tert-butyl-4-hydroxy-5-methylphenyl)propionate, 1,3,5-tris(3,5-di-tert-butyl-4-hydroxybenzyl)-1,3,5-triazine-2,4,6(1H,3H,5H)-trione, tris-(2-methyl-4-hydroxy-5-tert-butylphenyl)-butane, 6,6'-di-tert-butyl-4,4'-butylidenedi-m-cresol, stearyl 3-(3,5-di-tert-butyl-4-hydroxyphenyl) propionate, tetrakis[methylene-3-(3,5-di-tert-butyl-4-hydroxyphenyl)propionate]methane or bis(3,5-di-tert-butyl-4-hydroxybenzenepropionic acid)thiobisethylene ester. The phenol-type antioxidant is, in view of high solubility in the curable composition, preferably 2,6-di-tert-butyl-4-hydroxytoluene, tetrakis[methylene-3-(3,5-di-tert-butyl-4-hydroxyphenyl)propionate]methane, bis(3,5-di-tert-butyl-4-hydroxybenzenepropionic acid) thiobisethylene ester or the like.

The phosphorus-type antioxidant may, for example, be tris(2,4-di-tert-butylphenyl) phosphite, 3,9-bis(octadecyloxy)-2,4,8,10-tetraoxa-3,9-diphosphaspiro[5.5]undecane, 3,9-bis(2,4-di-tert-butylphenoxy)-2,4,8,10-tetraoxa-3,9-diphosphaspiro[5.5]undecane, 3,9-bis(2,6-di-tert-butyl-4-methylphenoxy)-2,4,8,10-tetraoxa-3,9-diphosphaspiro[5.5]undecane, bis(2,4-di-tert-butyl-6-methylphenyl)ethyl phosphite, 2,2'-methylenebis(4,6-di-tert-butylphenyl)2-ethylhexyl phosphite, triphenyl phosphite, isodecyl diphenyl phosphite, 2-ethylhexyl diphenyl phosphite or tris(2,4-di-tert-butylphenyl) phosphite. The phosphorus-type antioxidant is, in view of high solubility in the curable composition, preferably bis(2,4-di-tert-butyl-6-methylphenyl)ethyl phosphite, tris(2,4-di-tert-butylphenyl) phosphite, triphenyl phosphite or the like.

The sulfur-type antioxidant may, for example, be 1-hexanethiol, 1-heptanethiol, 1-octanethiol, tert-octanethiol, 1-nonanethiol, 1-decanethiol, 1-undecanethiol, 1-dodecanethiol, 1-tetradecanethiol, 1-hexadecanethiol, 1-octadecanethiol, 1,4-butanedithiol, 2,3-butanedithiol, 1,5-pentanedithiol, 1,6-hexanedithiol, 1,7-heptanedithiol, 1,8-octanedithiol, 1,9-nonanedithiol, 1,10-decanedithiol, 1,12-dodecanedithiol, 1,14-tetradecanedithiol, 1,16-hexadecanedithiol, 1,18-octadecanedithiol, dihexyl sulfide, diheptyl sulfide, dioctyl sulfide, didecyl sulfide, didodecyl sulfide, ditetradecyl sulfide, dihexadecyl sulfide, dioctadecyl sulfide, diphenyl sulfide, phenyl-p-tolyl sulfide, 4,4-thiobisbenzenethiol, 3,3'-thiodipropionic acid, dipropyl disulfide, diisopropyl disulfide, dibutyl disulfide, diisobutyl disulfide, di-tert-butyl disulfide, dihexyl disulfide, diheptyl disulfide, dioctyl disulfide, didecyl disulfide, didodecyl disulfide, ditetradecyl disulfide, ditridecyl-3,3'-thiodipropionate, dilauryl-3,3'-thiodipropionate, bis[2-methyl-4-{3-n-alkyl ($C_{12}$ or $C_{14}$)thio propionyloxy}-5-tert-butylphenyl] sulfide or 2,4-bis(octylthiomethyl)-6-methylphenol. The sulfur-type antioxidant is, in view of high solubility in the curable composition, preferably 1-decanethiol, 1-undecanethiol, 1-dodecanethiol, 2,4-bis(octylthiomethyl)-6-methylphenol or the like.

The antioxidant (E) may be used alone or in combination of two or more. As the antioxidant (E), with a view to improving the heat resistance of a cured product, it is preferred to use two or more members selected from the group consisting of the phenol-type antioxidant, the phosphorus-type antioxidant and the sulfur-type antioxidant in combination.

(Monomer (F))

The monomer (F) is a compound having at least one (meth)acryloyl group (excluding the monomer (A), the monomer (B) and the compound (C)).

As the monomer (F), preferred is one having a $C_{1-30}$ organic group bonded to a (meth)acryloyl group via an oxygen atom. The number of carbon atoms in the organic group is preferably from 4 to 20, more preferably from 4 to 12.

The organic group may, for example, be a straight-chain alkyl group, a branched alkyl group, a cycloalkyl group, an allyl group, a bridged hydrocarbon group, a group having a repeating structure of oxyalkylene chains, an aromatic group or a heterocyclic group. In such a group, one or more of the carbon atoms may be substituted by a hetero atom such as a nitrogen atom or an oxygen atom, or by a silicon atom, or one or more of the hydrogen atoms may be substituted by a functional group such as a hydroxy group or an amino group, or it may have an unsaturated bond or a free carboxy group. As the organic group, preferred is a straight-chain alkyl group, a branched alkyl group, a cycloalkyl group or a bridged hydrocarbon group.

The monomer (F) may be a monomer (F1) having one (meth)acryloyloxy group (excluding the monomer (A), the monomer (B) and the compound (C)) or a monomer (F2) having two or more (meth)acryloyloxy groups (excluding the monomer (A), the monomer (B) and the compound (C)).

As the monomer (F1), an acrylic acid ester or a methacrylic acid ester is preferred. As the monomer (F1), the following compounds may be mentioned.

2-Ethylhexyl (meth)acrylate, butyl (meth)acrylate, ethoxyethyl (meth)acrylate, methoxyethyl (meth)acrylate, allyl (meth)acrylate, 2-hydroxyethyl (meth)acrylate, 2-hydroxypropyl (meth)acrylate, octyl (meth)acrylate, decyl (meth)acrylate, n-butyl (meth)acrylate, tert-butyl (meth)acrylate, behenyl (meth)acrylate, stearyl (meth)acrylate, isostearyl (meth)acrylate, lauryl (meth)acrylate, glycidyl (meth)acrylate, tetrahydrofurfuryl (meth)acrylate, 2-methyl-2-adamantyl (meth)acrylate, 2-ethyl-2-adamantyl (meth)acrylate, 3-hydroxy-1-adamantyl (meth)acrylate, 1-adamantyl (meth)acrylate, isobornyl (meth)acrylate, 4-tert-butylcyclohexyl (meth)acrylate, 3-(trimethoxysilyl)propyl (meth)acrylate, N,N-diethylaminoethyl (meth)acrylate, N,N-dimethylaminoethyl (meth)acrylate, (2-(tert-butylamino)ethyl (meth)acrylate, phenoxyethyl (meth)acrylate, 2-hydroxy-3-phenoxypropyl (meth)acrylate, 2-(4-benzoyl-3-hydroxyphenoxy)ethyl (meth)acrylate, phenoxyethylene glycol (meth)acrylate, phenoxydiethylene glycol (meth)acrylate, methoxy triethylene glycol (meth)acrylate, methoxy polyethylene glycol (meth)acrylate, 2-(meth)acryloyloxyethyl hexahydrophthalic acid, 2-(meth)acryloyloxyethyl succinic acid, benzyl (meth)acrylate, 1,2,2,6,6-pentamethyl-4-piperidyl (meth)acrylate, etc.

As the monomer (F2), preferred is a (meth)acrylate of a diol (such as glycol), a (meth)acrylate of a triol (such as glycerol or trimethylol), a (meth)acrylate of a tetraol (such as pentaerythritol), or urethane (meth)acrylate or epoxy (meth)acrylate. As the monomer (F2), the following compounds may be mentioned.

A polyoxyethylene glycol di(meth)acrylate (ethylene glycol di(meth)acrylate, diethylene glycol di(meth)acrylate, tetraethylene glycol di(meth)acrylate, etc.), a polypropylene glycol di(meth)acrylate (dipropylene glycol di(meth)acrylate, etc.), 1,3-butanediol di(meth)acrylate, 1,4-butanediol di(meth)acrylate, glycerol 1,3-diglycerolate di(meth)acrylate, 1,6-hexanediol ethoxylate di(meth)acrylate, 1,6-hexanediol propoxylate di(meth)acrylate, 1,6-hexanediol di(meth)acrylate, 3-hydroxy-2,2-dimethyl-propionate di(meth)acrylate, 1,9-nonanediol di(meth)acrylate, 1,10-decanediol di(meth)acrylate, neopentyl glycol di(meth)acrylate, neopentyl glycol propoxylate di(meth)acrylate, glycerol di(meth)acrylate, propylene glycol glycerolate di(meth)acrylate, tripropylene glycol di(meth)acrylate, triethylene glycol di(meth)acrylate, tetraethylene glycol di(meth)acrylate, tripropylene glycol glycerolate di(meth)acrylate, 2-hydroxy-3-acryloyloxypropyl (meth)acrylate, 2-methyl-1,3-propanediol diacrylate, tricyclodecane dimethanol diacrylate, trimethylolpropane tri(meth)acrylate, trimethylolpropane ethoxy tri(meth)acrylate, ethoxylated trimethylolpropane triacrylate, propoxylated trimethylolpropane triacrylate, 1,3-bis(3-methacryloyloxy propyl)-1,1,3,3-tetramethyldisiloxane, glycerol propoxy tri(meth)acrylate, pentaerythritol di(meth)acrylate monostearyl acid, trimethylolpropane ethoxylate methyl ether di(meth)acrylate, pentaerythritol tri(meth)acrylate, pentaerythritol tetra(meth) acrylate, pentaerythritolethoxy tetra(meth)acrylate, ditrimethylolpropane tetra(meth)acrylate, propoxylated pentaerythritol tetraacrylate, dipentaerythritol hexa(meth)acrylate, etc.

The compound (F) may be used alone or in combination of two or more.

(Additives)

The additives include surface active agents, thixotropic agents, antifoaming agents, light stabilizers, anti-gelling agents, photosensitizers, resins, carbon compounds, metal fine particles, metal oxide fine particles, silane coupling agents, other organic compounds, etc.

(Solvent)

The curable composition of the present invention may contain a solvent. However, prior to curing the curable composition, it is preferred to remove the solvent.

As the solvent, it is possible to use any solvent so long as it is a solvent capable of dissolving the monomers (A), (B) and (F), the compound (C), the antioxidant (E) and the polymerization initiator (D), and a solvent having at least one of an ester structure, a ketone structure, a hydroxy group and an ether structure is preferred.

In the case of using a solvent in the present invention, the content of the solvent in the curable composition may suitably be adjusted depending on the desired viscosity, the coating properties, the desired thickness, etc.

(Content of Component in Curable Composition)

The content of the monomer (A) is preferably from 4 to 90 mass % based on 100 mass % of the total content of the monomer (A), the monomer (B) and the compound (C). When the content is at least 4 mass %, the viscosity of the curable composition can be made low. The content is preferably at least 14 mass %, more preferably at least 24 mass %, further preferably at least 34 mass %. When the content of the monomer (A) is at most 90 mass %, an increase of the Abbe number and a decrease of the refractive index of the cured product can be suppressed. The content is preferably at most 79 mass %, more preferably at most 69 mass %, further preferably at most 59 mass %.

The content of the monomer (B) is preferably from 3 to 89 mass % based on 100 mass % of the total content of the monomer (A), the monomer (B) and the compound (C). When the content is at least 3 mass %, an effect to increase the refractive index of the cured product, an effect to increase the transmittance and an effect to increase the heat resistance can be obtained. Further, mechanical properties of the cured product will be favorable. The content is preferably at least 4 mass %, more preferably at least 5 mass %. When the content of the monomer (B) is at most 89 mass %, the viscosity of the curable composition can be made low. The content is preferably at most 79 mass %, more preferably at most 69 mass %, further preferably at most 59 mass %.

The content of the compound (C) is from 1 to 10 mass % based on 100 mass % of the total content of the monomer (A), the monomer (B) and the compound (C). When the content is at least 1 mass %, an effect to lower the Abbe number of the curable composition can be obtained. The content is preferably at least 1.5 mass %, more preferably at least 2.0 mass %. When the content of the compound (C) is at most 10 mass %, a decrease of the transmittance of the cured product can be suppressed. The content is preferably at most 9.5 mass %, more preferably at most 9.0 mass %.

The added amount of the polymerization initiator (D) is preferably from 0.01 to 10 parts by mass based on 100 parts by mass of the total content of the monomer (A), the monomer (B) and the compound (C). When the added amount is at least 0.01 part by mass, the cured product can easily be formed. The added amount is preferably at least 0.1 part by mass, more preferably at least 0.3 part by mass. When the added amount of the polymerization initiator (D) is at most 10 parts by mass, the amount of the polymerization initiator (D) remaining in the cured product is small, whereby a decrease of the internal transmittance of the cured product can be suppressed. The added amount is preferably at most 7 parts by mass, more preferably at most 5 parts by mass. In a case where the antioxidant (E) is contained, the added amount of the antioxidant (E) is preferably from 0.01 to 10 parts by mass based on 100 parts by mass of the total content of the monomer (A), the monomer (B) and the compound (C). When the added amount is at least 0.01 part by mass, the initial transmittance of the cured product can be improved, and yellowing of the cured product can be suppressed. The added amount is preferably at least 0.1 part by mass, more preferably at least 0.3 part by mass. When the added amount of the antioxidant (E) is at most 10 parts by mass, a decrease of the curing property of the cured product can be suppressed. The added amount is preferably at most 8 parts by mass, more preferably at most 5 parts by mass.

The curable composition of the present invention should better not contain the monomer (F) as much as possible. The added amount of the monomer (F) is preferably from 0 to 5 parts by mass, more preferably from 0 to 3 parts by mass based on 100 parts by mass of the total content of the monomer (A), the monomer (B) and the compound (C). When the added amount of the monomer (F) is at most the upper limit value of the above range, a decrease of the refractive index of the cured product and an increase of the Abbe number of the cured product can be suppressed.

The total added amount of other components such as additives is preferably at most 5 parts by mass, more preferably at most 3 parts by mass based on 100 parts by mass of the total of all compounds having a crosslinkable reactive group and the compound (C).

From the above-described curable composition of the present invention, from the following reasons, a cured product having a high refractive index, a low Abbe number, high transparency and high heat resistance can be obtained. Further, the curable composition of the present invention has a low viscosity.

Since the curable composition of the present invention comprises the monomer (A) in which the proportion (X) is at least 47 mass % based on 100 mass % of one monomer molecule, the viscosity of the curable composition can be made low, and the Abbe number of the cured product can be made low. Further, by using the monomer (B) having a high refractive index and high transparency and further excellent heat resistance in combination, a cured product having a high refractive index and high transparency and further excellent heat resistance can be obtained. However, a further decrease of the Abbe number of the cured product is not achieved only by using the monomer (A) and the monomer (B) in combination. Accordingly, by further using the compound (C) having an Abbe number of at most 21 in combination, the Abbe number of the cured product is further decreased.

<Cured Product>

The cured product of the present invention is one obtained by curing the curable composition of the present invention. The cured product of the present invention may be formed on the surface of a substrate to obtain a laminate having a layer made of the cured product and a layer made of the substrate.

The refractive index of the cured product to light having a wavelength of 589 nm is preferably at least 1.60, more preferably at least 1.61. When the refractive index is at least the lower limit value of the above range, when the cured product is used as a material of an optical member, it can be made thin. The upper limit is not particularly limited, but is about 1.85 considering that the cured product is made of organic substances.

The Abbe number $v_D$ of the cured product is preferably at most 25, more preferably at most 24. When the Abbe number $v_D$ is at most the upper limit value of the above range, by using the cured product with a material having a high Abbe number in combination as a material of an optical member, the chromatic aberration can be reduced. The Abbe number $v_D$ is preferably as low as possible and its lower limit is not particularly limited, but is about 19 considering that the cured product is made of organic substances.

The internal transmittance of the cured product for light having a wavelength of 400 nm per 1 mm thickness, as obtained from the following formula (III), is preferably at least 90 mass %, more preferably at least 92 mass %. The internal transmittance of the cured product is preferably as high as possible, and the upper limit is 100%.

Internal transmittance=$T/(1-r)^2$ $r=\{(n-1)/(n+1)\}^2$ (III)

wherein T is the light transmittance of the cured product having a thickness of 1 mm for light having a wavelength of 400 nm, and n is the refractive index to light having a wavelength of 400 nm at 25° C.

When the thickness of the cured product is not 1 mm, the transmittance of the cured product per 1 mm thickness is obtained from the transmittance of a cured product having a thickness of Y mm from the following formulae IV and V.

Internal transmittance of cured product per Y mm thickness=$T_Y/(1-r)^2$ $r=\{(n-1)/(n+1)\}^2$ Formula IV wherein $T_Y$ is the transmittance of the cured product per Y mm thickness for light having a wavelength of 400 nm, and n is the refractive index of the cured product to light having a wavelength of 400 nm at 25° C.

Internal transmittance of cured product per 1 mm thickness=(internal transmittance of cured product per Y mm thickness/100)$^Y$×100  Formula V (Method for Producing Cured Product)

The method for producing a cured product of the present invention may be a method (imprinting method) of curing the curable composition in a state where the curable composition is in contact with a mold having a reverse pattern of a fine pattern on its surface, to form a cured product having the fine pattern on its surface; or a method (injecting molding method) of injecting the curable composition into a mold cavity, and curing the curable composition to form a cured product.

The curing method may be photo-curing or thermal curing, and may be suitably selected depending on the polymerization initiator (D). As the curing method, from the viewpoint of efficiency for the production of a cured product, photo-curing is preferred.

The above-described cured product of the present invention, which is obtained by curing the curable composition of the present invention, has a high refractive index, a low Abbe number, high transparency and high heat resistance.

EXAMPLES

The present invention will be described in further detail with reference to Examples, but the present invention is not limited thereto.

Ex. 1 to 26 are Examples of the present invention, and Ex. 27 to 37 are Comparative Examples.

($^1$H-NMR)

The $^1$H-NMR spectrum of the monomer (A) was measured by FT-NMR apparatus (manufactured by JEOL Ltd., JNM-AL300).

(Refractive Index of Monomer and Compound)

The refractive index of each of the monomers and the compound was measured at a temperature of 25° C. at a wavelength of 589 nm by using an Abbe refractometer (manufactured by Atago Co., Ltd., multiwavelength Abbe refractometer DR-M2). With respect to the monomer or compound which is solid at 25° C., a 25 mass % solution was prepared using dibenzyl ether (manufactured by Tokyo Chemical Industry Co., Ltd.) as a solvent and the refractive index of the solution was measured, and the refractive index of the monomer or compound was obtained by extrapolation from the refractive index of the solution and the refractive index of dibenzyl ether.

(Abbe Number of Monomer and Compound)

The Abbe number of each of the monomers and the compound was calculated from the above formula (II) by measuring the respective refractive indices at wavelengths of 589 nm, 486 nm and 656 nm, at a temperature of 25° C. by the Abbe refractometer (the same as mentioned above).

(Viscosity of Monomer and Curable Composition)

The viscosity of each of the monomers and the curable composition was obtained by measuring the dynamic viscoelasticity at a shear rate of 10 s$^{-1}$ at 25° C. by a dynamic viscoelasticity measuring apparatus (manufactured by Anton Paar GmbH, Physica MCR301).

(Refractive Index of Cured Product)

A curable composition was applied to the surface of a quartz glass substrate having a release treatment applied thereto, and sandwiched with another quartz glass substrate having a release treatment applied thereto via a spacer having a thickness of 1 mm, the assembly was irradiated with ultraviolet rays from a high pressure mercury lamp at an exposure amount of 3,000 mJ/cm$^2$, and the resulting cured product was released from the quartz glass substrates. The obtained film-form cured product was baked at 125° C. for 15 minutes to obtain a cured product having a thickness of 1 mm. By using a refractive index measuring device (manufactured by US Metricon Corporation, prism coupler: 2010/M), the refractive indices to lights having wavelengths of 473 nm, 594 nm and 658 nm, of the cured product at 25° C. were measured, and by using Metricon Fit attached to the apparatus, the refractive index to light having a wavelength of 589 nm was calculated.

(Abbe Number of Cured Product)

The refractive indices at the respective wavelengths of the cured product were calculated by using Metricon Fit attached to the apparatus, and the Abbe number was calculated from the above formula (II).

(Internal Transmittance of Cured Product)

The refractive index n of the cured product to light having a wavelength of 400 nm was calculated by using Metricon Fit attached to the apparatus. Of a cured product having a thickness of 1 mm, the light transmittance for light having a wavelength of 400 nm was measured by using an ultraviolet/visible/near infrared spectrophotometer (manufactured by Shimadzu Corporation, Solid Spec-3700). Then, the internal transmittance was calculated from the above the formula (III).

(Heat Resistance)

The cured product was put in an oven at 150° C. and kept for 100 hours. Changes of the cured product after being kept were visually observed and evaluated based on the following standards.

○ (good): No change observed on the cured product
x (poor): Coloring observed on the cured product Preparation Example 1

Preparation of o-Phenylbenzyl Acrylate (Monomer (A-1))

Into a 200 mL three-necked flask, 10.0 g of o-phenylbenzyl alcohol, 100 mL of dehydrated toluene and 7.6 g of triethylamine were charged, and cooled to 10° C. or below in an ice bath with stirring. 6.0 g of acrylic chloride was dropwise added over a period of 30 minutes, the temperature of the mixture was returned to room temperature, and the reaction was carried out for 12 hours. After completion of the reaction, the reaction solution was poured into water, washed with a saturated aqueous sodium hydrogen carbonate solution and then with a saturated salt solution, desolvated and purified by silica gel column to obtain 20.44 g of a transparent liquid. The obtained liquid was confirmed to be monomer (A-1) by $^1$H-NMR measurement. $^1$H-NMR (300 MHz, solvent: acetone d-6, standard: trimethylsilane): 7.53-7.30 (9H), 6.41 (1H), 6.17 (1H), 5.78 (1H), 5.13 (2H).

Preparation Example 2

Preparation of m-Phenoxybenzyl Acrylate (Monomer (A-3))

Into a 300 mL three-necked flask, 25.0 g of m-phenoxybenzyl alcohol, 200 mL of dehydrated tetrahydrofuran and 19.0 g of triethylamine were charged, and cooled to 10° C. or below in an ice bath with stirring. 12.5 g of acrylic chloride was dropwise added over a period of 30 minutes, the temperature of the mixture was returned to room temperature, and the reaction was carried out for 12 hours. After completion of the reaction, the reaction solution was poured into water, washed with a saturated aqueous sodium hydrogen carbonate solution and then with a saturated salt solution, desolvated and purified by silica gel column to obtain 22.2 g of a transparent liquid. The obtained liquid was confirmed to be monomer (A-3) by $^1$H-NMR measurement. $^1$H-NMR (300 MHz, solvent: acetone d-6, standard: trimethylsilane): 7.31 (3H), 7.12-7.07 (3H), 6.98 (2H), 6.91 (1H), 6.37 (1H), 6.15 (1H), 5.81 (1H), 5.15 (2H).

Preparation Example 3

Preparation of 1-Naphthylmethyl Acrylate (Monomer (A-4))

Into a 300 mL three-necked flask, 25.0 g of 1-naphthalenemethanol, 200 mL of dehydrated acetone and 21.8 g of triethylamine were charged and cooled to 10° C. or below in an ice bath with stirring. 18.1 g of acrylic chloride was dropwise added over a period of 30 minutes, the temperature of the mixture was returned to room temperature, and the reaction was carried out for 12 hours. After completion of the reaction, the reaction solution was poured into water, washed with a saturated aqueous sodium hydrogen carbonate solution and then with a saturated salt solution, desolvated and purified by silica gel column to obtain 24.8 g of a transparent liquid. The obtained liquid was confirmed to be monomer (A-4) by $^1$H-NMR measurement. $^1$H-NMR (300 MHz, solvent: acetone d-6, standard: trimethylsilane): 8.01 (1H), 7.79 (2H), 7.44 (4H), 6.37 (1H), 6.10 (1H), 5.67 (1H), 5.61 (2H).

Preparation Example 4

Preparation of 4-(2-Naphthalenylthio)Benzyl Acrylate (Compound (C-10))

Into a 500 mL three-necked flask, 54.6 g (340 mmol) of 2-naphthalenethiol, 52.1 g (420 mmol) of 4-fluorobenzaldehyde, 300 mL of dehydrated acetonitrile and 70.0 g (507 mmol) of potassium carbonate were charged, followed by reflux for 6 hours with stirring in a nitrogen atmosphere. Then, the temperature of the mixture was returned to room temperature, the reaction solution was filtrated, and the solvent was distilled off by a rotary evaporator. The obtained solid was dissolved in ethyl acetate and washed with an aqueous HCl solution (1M) and then with a saturated salt solution. Recrystallization was conducted from hexane to obtain 78.1 g of a pale yellow solid. Then, into a 1 L three-necked flask, 78.1 g (300 mmol) of the obtained pale yellow solid, 350 mL of methanol and 150 mL of tetrahydrofuran were added and cooled to 10° C. or below in an ice bath with stirring. 22.3 g of sodium borohydrate was added dividedly in four times, and the temperature of the mixture was returned to room temperature, followed by stirring further for 4 hours. Completion of the reaction was confirmed by thin layer chromatography (TLC), and then 200 mL of an aqueous HCl solution (1M) and 100 mL of ethyl acetate were added, followed by stirring further for 30 minutes. Then, the organic layer was extracted and washed with a saturated salt solution. The solvent was distilled off by a rotary evaporator to obtain 76.5 g of a white solid.

Then, in a 1 L three-necked flask, 76.5 g of the obtained white solid and 43.3 g (428 mmol) of triethylamine were added, and 400 mL of tetrahydrofuran was added thereto, and cooled to 10° C. or below in an ice bath with stirring. 31.0 g (342 mmol) of acryloyl chloride was dropwise added thereto over a period of 2 hours, followed by stirring at 10° C. or below for 3 hours, and the temperature of the mixture was returned to room temperature, followed by stirring overnight. Then, 200 mL of an aqueous HCl solution (1M) and 100 mL of ethyl acetate were added, followed by stirring further for 30 minutes. Then, the organic layer was extracted and washed with a saturated salt solution, with a saturated aqueous sodium bicarbonate solution and with a saturated salt solution in this order. The reaction mixture was purified by silica gel column (developing solvent:ethyl acetate/hexane=1/4) to obtain a white solid. The obtained solid was subjected to recrystallization from methanol to obtain 69.1 g of compound (C-10). The compound was identified as compound (C-10) by $^1$H-NMR.

$^1$H-NMR (acetone-d6, tetramethylsilane (TMS), 300 MHz): 7.88 (s, 1H of naphthalene ring), 7.71 (m, 3H of naphthalene ring and benzene ring), 7.40-7.31 (m, 7H of naphthalene ring and benzene ring), 6.38 (d, 1H of CH=CH$_2$), 6.14 (q, 1H of CH=CH$_2$), 5.75 (d, 1H of CH=CH$_2$), 5.15 (s, 2H of CH$_2$-Ph).

(Monomer (A))

Monomer (A-1): o-phenylbenzyl acrylate (obtained in Preparation Example 1, X: 64.3 mass %, n$_D$: 1.583, v$_D$: 24.1, viscosity: 27 mPa·s).

Monomer (A-2): 2-(o-phenylphenoxy)ethyl acrylate (manufactured by Shin-Nakamura Chemical Co., Ltd., A-LEN-10, X: 57.1 mass %, n$_D$: 1.577, v$_D$: 25.9, viscosity: 150 mPa·s).

Monomer (A-3): m-phenoxybenzyl acrylate (obtained in Preparation Example 2, X: 60.2 mass %, n$_D$: 1.564, v$_D$: 28.0, viscosity: 15 mPa·s).

Monomer (A-4): 1-naphthylmethyl acrylate (obtained in Preparation Example 3, X: 59.9 mass %, n$_D$: 1.594, v$_D$: 23.0, viscosity: 95 mPa·s).

Monomer (A-5): a mixture of o-phenylbenzyl acrylate and m-phenylbenzyl acrylate (manufactured by DIC Corporation, UNIDIC (registered trademark) EKZ-948, X: 64.3 mass %, n$_D$: 1.591, v$_D$: 24.1, viscosity: 25 mPa·s).

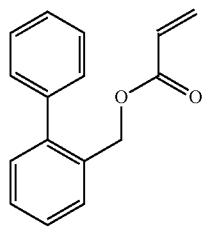

(A-1)

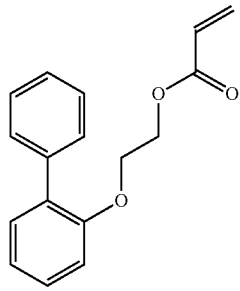

(A-2)

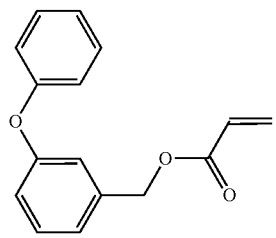

(A-3)

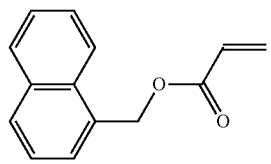

(A-4)

(Monomer (B))

Monomer (B-1): 9,9-bis(4-(2-acryloyloxyethoxy)phenyl)fluorene (manufactured by Osaka Gas Chemicals Co., Ltd., OGSOL (registered trademark) EA-0200, solvent: toluene (5 mass %), n$_D$: 1.611, v$_D$: 27.5, viscosity: 100,000 mPa·s or higher).

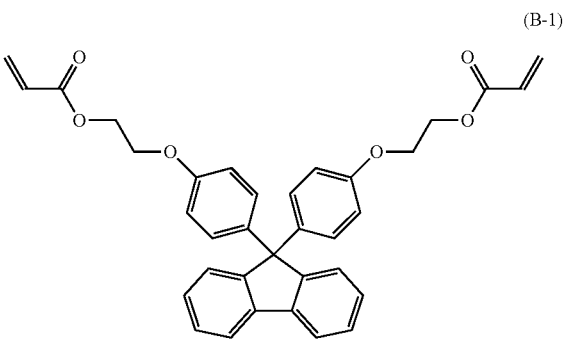 [SMILES: C=CC(=O)OCCOc1ccc(C2(c3ccc(OCCOC(=O)C=C)cc3)c3ccccc3-c3ccccc32)cc1]

(B-1)

(Compound (C))

Compound (C-1): bis(4-methacryloylthiophenyl) sulfide (manufactured by Tokyo Chemical Industry Co., Ltd., n$_D$: 1.646, v$_D$: 20.1, solid at 25° C.).

Compound (C-2): 9-vinylcarbazole (manufactured by Tokyo Chemical Industry Co., Ltd., n$_D$: 1.680, v$_D$: 16.4, solid at 25° C.).

Compound (C-3): 2-vinylnaphthalene (manufactured by Sigma-Aldrich, n$_D$: 1.653, v$_D$: 16.4, solid at 25° C.).

Compound (C-4): 2-(9-carbazoyl)ethyl methacrylate (manufactured by Sigma-Aldrich, n$_D$: 1.629, v$_D$: 20.3, solid at 25° C.).

Compound (C-5): 9-phenylcarbazole (manufactured by Tokyo Chemical Industry Co., Ltd., n$_D$: 1.686, v$_D$: 18.0, solid at 25° C.).

Compound (C-6): poly(2-vinylnaphthalene) (manufactured by Sigma-Aldrich, n$_D$: 1.683, v$_D$: 17.0, solid at 25° C.).

Compound (C-7): polyacenaphthylene (manufactured by Sigma-Aldrich, n$_D$: 1.676, v$_D$: 19.0, solid at 25° C.

Compound (C-8): poly(9-vinylcarbazole) (manufactured by Sigma-Aldrich, n$_D$: 1.687, v$_D$: 17.5, solid at 25° C.).

Compound (C-9): special polycarbonate resin (manufactured by MITSUBISHI GAS CHEMICAL COMPANY, INC., lupizeta (registered trademark) EP-8000, n$_D$: 1.656, v$_D$: 20.5, solid at 25° C.).

Compound (C-10): 4-(2-naphthalenylthio)benzyl acrylate (obtained in Preparation Example 4, $n_D$: 1.647, $v_D$: 20.1, solid at 25° C.)

(C-1)

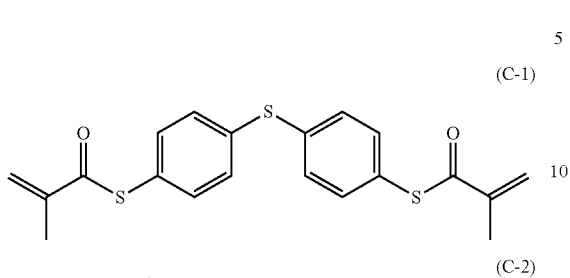

(C-2)

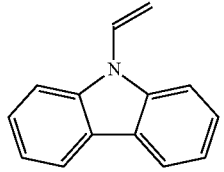

(C-3)

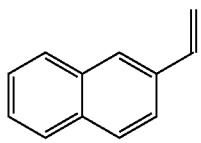

(C-4)

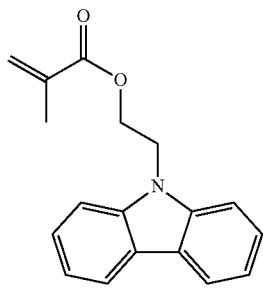

(C-5)

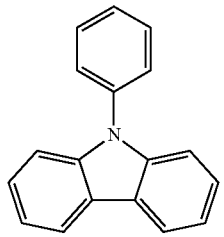

(C-6)

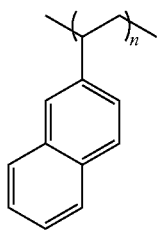

(C-7)

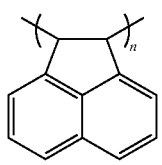

(C-8)

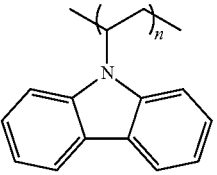

(C-10)

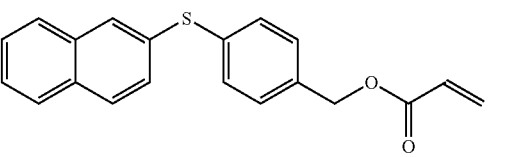

(Polymerization Initiator (D))

Polymerization initiator (D-1): alkylphenone-type photo-polymerization initiator (manufactured by BASF Japan, IRGACURE (tradename) 1173).

(Antioxidant (E))

Compound (E-1): tetrakis[methylene-3-(3,5-di-tert-butyl-4-hydroxyphenyl)propionate]methane (phenol-type antioxidant, manufactured by BASF Japan, IRGANOX (tradename) 1010).

Compound (E-2): tris(2,4-di-tert-butylphenyl) phosphite (phosphorus-type antioxidant, manufactured by BASF Japan, IRGAFOS (tradename) 168).

Compound (E-3): dodecanethiol (manufactured by Tokyo Chemical Industry Co., Ltd.).

(Monomer (F))

Monomer (F-1): tricyclodecanedimethanol diacrylate (manufactured by Shin-Nakamura Chemical Co., Ltd., A-DCP, X: 0 mass %, $n_D$: 1.503, $v_D$: 47.9, viscosity: 120 mPa·s).

monomer (F-2): benzyl methacrylate (manufactured by Tokyo Chemical Industry Co., Ltd., X: 46.8 mass %, $n_D$: 1.510, $v_D$: 32.7, viscosity: 3 mPa·s).

(F-1)

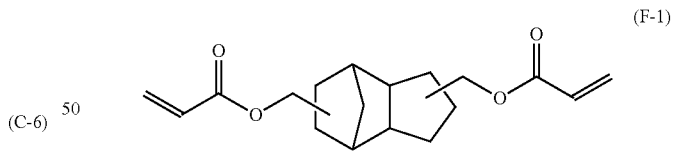

(F-2)

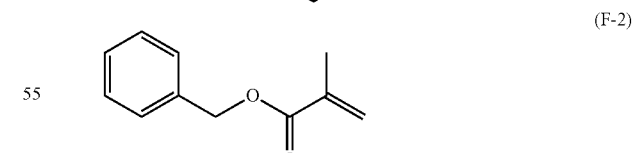

Ex. 1 to 37

The respective components as identified in Table 1 were blended in accordance with the blend ratio (numerical values: parts by mass), stirred and mixed by a mix rotor to obtain a uniform transparent curable composition.

TABLE 1

| Ex. | Monomer (A) Type | Parts | Monomer (B) Type | Parts | Compound (C) Type | Parts | Monomer (F) Type | Parts | Polymerization initiator (D) Type | Parts | Antioxidant (E) Type | Parts | Type | Parts | Type | Parts |
|---|---|---|---|---|---|---|---|---|---|---|---|---|---|---|---|---|
| 1 | (A-1) | 49.5 | (B-1) | 49.5 | (C-1) | 1 | — | — | (D-1) | 1 | — | — | — | — | — | — |
| 2 | (A-1) | 48.5 | (B-1) | 48.5 | (C-1) | 3 | — | — | (D-1) | 1 | — | — | — | — | — | — |
| 3 | (A-1) | 47.5 | (B-1) | 47.5 | (C-1) | 5 | — | — | (D-1) | 1 | — | — | — | — | — | — |
| 4 | (A-1) | 46.5 | (B-1) | 46.5 | (C-1) | 7 | — | — | (D-1) | 1 | — | — | — | — | — | — |
| 5 | (A-1) | 45 | (B-1) | 45 | (C-1) | 10 | — | — | (D-1) | 1 | — | — | — | — | — | — |
| 6 | (A-1) | 47.5 | (B-1) | 47.5 | (C-1) | 5 | — | — | (D-1) | 1 | (E-1) | 0.5 | (E-2) | 0.5 | (E-3) | 1 |
| 7 | (A-1) | 47.5 | (B-1) | 47.5 | (C-2) | 5 | — | — | (D-1) | 1 | (E-1) | 0.5 | (E-2) | 0.5 | (E-3) | 1 |
| 8 | (A-1) | 47.5 | (B-1) | 47.5 | (C-3) | 5 | — | — | (D-1) | 1 | (E-1) | 0.5 | (E-2) | 0.5 | (E-3) | 1 |
| 9 | (A-1) | 47.5 | (B-1) | 47.5 | (C-4) | 5 | — | — | (D-1) | 1 | (E-1) | 0.5 | (E-2) | 0.5 | (E-3) | 1 |
| 10 | (A-1) | 47.5 | (B-1) | 47.5 | (C-5) | 5 | — | — | (D-1) | 1 | (E-1) | 0.5 | (E-2) | 0.5 | (E-3) | 1 |
| 11 | (A-1) | 45 | (B-1) | 45 | (C-5) | 10 | — | — | (D-1) | 1 | (E-1) | 0.5 | (E-2) | 0.5 | (E-3) | 1 |
| 12 | (A-1) | 47.5 | (B-1) | 47.5 | (C-6) | 5 | — | — | (D-1) | 1 | (E-1) | 0.5 | (E-2) | 0.5 | (E-3) | 1 |
| 13 | (A-1) | 47.5 | (B-1) | 47.5 | (C-7) | 5 | — | — | (D-1) | 1 | (E-1) | 0.5 | (E-2) | 0.5 | (E-3) | 1 |
| 14 | (A-1) | 47.5 | (B-1) | 47.5 | (C-8) | 5 | — | — | (D-1) | 1 | (E-1) | 0.5 | (E-2) | 0.5 | (E-3) | 1 |
| 15 | (A-1) | 47.5 | (B-1) | 47.5 | (C-9) | 5 | — | — | (D-1) | 1 | (E-1) | 0.5 | (E-2) | 0.5 | (E-3) | 1 |
| 16 | (A-1) | 47.5 | (B-1) | 47.5 | (C-10) | 5 | — | — | (D-1) | 1 | (E-1) | 0.5 | (E-2) | 0.5 | (E-3) | 1 |
| 17 | (A-1) | 85.5 | (B-1) | 9.5 | (C-1) | 5 | — | — | (D-1) | 1 | (E-1) | 0.5 | (E-2) | 0.5 | (E-3) | 1 |
| 18 | (A-1) | 28.5 | (B-1) | 66.5 | (C-1) | 5 | — | — | (D-1) | 1 | (E-1) | 0.5 | (E-2) | 0.5 | (E-3) | 1 |
| 19 | (A-2) | 63 | (B-1) | 27 | (C-5) | 10 | — | — | (D-1) | 1 | (E-1) | 0.5 | (E-2) | 0.5 | (E-3) | 1 |
| 20 | (A-3) | 45 | (B-1) | 45 | (C-5) | 10 | — | — | (D-1) | 1 | (E-1) | 0.5 | (E-2) | 0.5 | (E-3) | 1 |
| 21 | (A-4) | 45 | (B-1) | 45 | (C-5) | 10 | — | — | (D-1) | 1 | (E-1) | 0.5 | (E-2) | 0.5 | (E-3) | 1 |
| 22 | (A-5) | 47.5 | (B-1) | 47.5 | (C-1) | 5 | — | — | (D-1) | 1 | (E-1) | 0.5 | (E-2) | 0.5 | (E-3) | 1 |
| 23 | (A-5) | 47.5 | (B-1) | 47.5 | (C-2) | 5 | — | — | (D-1) | 1 | (E-1) | 0.5 | (E-2) | 0.5 | (E-3) | 1 |
| 24 | (A-5) | 47.5 | (B-1) | 47.5 | (C-3) | 5 | — | — | (D-1) | 1 | (E-1) | 0.5 | (E-2) | 0.5 | (E-3) | 1 |
| 25 | (A-5) | 47.5 | (B-1) | 47.5 | (C-4) | 5 | — | — | (D-1) | 1 | (E-1) | 0.5 | (E-2) | 0.5 | (E-3) | 1 |
| 26 | (A-5) | 47.5 | (B-1) | 47.5 | (C-5) | 5 | — | — | (D-1) | 1 | (E-1) | 0.5 | (E-2) | 0.5 | (E-3) | 1 |
| 27 | (A-1) | 50 | (B-1) | 50 | — | — | — | — | (D-1) | 1 | (E-1) | 0.5 | (E-2) | 0.5 | (E-3) | 1 |
| 28 | (A-2) | 70 | (B-1) | 30 | — | — | — | — | (D-1) | 1 | (E-1) | 0.5 | (E-2) | 0.5 | (E-3) | 1 |
| 29 | (A-3) | 50 | (B-1) | 50 | — | — | — | — | (D-1) | 1 | (E-1) | 0.5 | (E-2) | 0.5 | (E-3) | 1 |
| 30 | (A-4) | 50 | (B-1) | 50 | — | — | — | — | (D-1) | 1 | (E-1) | 0.5 | (E-2) | 0.5 | (E-3) | 1 |
| 31 | (A-5) | 50 | (B-1) | 50 | — | — | — | — | (D-1) | 1 | (E-1) | 0.5 | (E-2) | 0.5 | (E-3) | 1 |
| 32 | — | — | (B-1) | 28.5 | (C-1) | 5 | (F-1) | 66.5 | (D-1) | 1 | (E-1) | 0.5 | (E-2) | 0.5 | (E-3) | 1 |
| 33 | — | — | (B-1) | 47.5 | (C-1) | 5 | (E-2) | 47.5 | (D-1) | 1 | (E-1) | 0.5 | (E-2) | 0.5 | (E-3) | 1 |
| 34 | (A-1) | 42.5 | (B-1) | 42.5 | (C-1) | 15 | — | — | (D-1) | 1 | (E-1) | 0.5 | (E-2) | 0.5 | (E-3) | 1 |
| 35 | (A-5) | 42.5 | (B-1) | 42.5 | (C-1) | 15 | — | — | (D-1) | 1 | (E-1) | 0.5 | (E-2) | 0.5 | (E-3) | 1 |
| 36 | (A-1) | 42.5 | (B-1) | 42.5 | (C-1) | 15 | — | — | (D-1) | 1 | — | — | — | — | — | — |
| 37 | (A-5) | 42.5 | (B-1) | 42.5 | (C-1) | 15 | — | — | (D-1) | 1 | — | — | — | — | — | — |

The viscosity of the curable composition, and the refractive index, the Abbe number, the internal transmittance and the heat resistance of the cured product are shown in Table 2.

TABLE 2

| Ex. | Curable composition Viscosity [mPa·s] | Physical properties of cured film Refractive index ($n_D$) | Abbe number ($v_D$) | Internal transmittance [%] | Heat resistance |
|---|---|---|---|---|---|
| 1 | — | 1.628 | 24.7 | 97.4 | ○ |
| 2 | — | 1.629 | 24.8 | 96.9 | ○ |
| 3 | 1480 | 1.630 | 24.5 | 95.9 | ○ |
| 4 | — | 1.632 | 24.0 | 95.1 | ○ |
| 5 | 2260 | 1.633 | 24.1 | 91.7 | ○ |
| 6 | — | 1.628 | 24.9 | 96.3 | ○ |
| 7 | — | 1.624 | 24.3 | 92.0 | ○ |
| 8 | — | 1.628 | 24.8 | 91.2 | ○ |
| 9 | — | 1.629 | 24.7 | 91.1 | ○ |
| 10 | — | 1.630 | 24.8 | 92.8 | ○ |
| 11 | 2900 | 1.631 | 23.4 | 91.3 | ○ |
| 12 | — | 1.628 | 24.6 | 90.1 | ○ |
| 13 | — | 1.628 | 24.4 | 90.3 | ○ |
| 14 | — | 1.629 | 24.2 | 91.6 | ○ |
| 15 | — | 1.625 | 24.4 | 97.5 | ○ |
| 16 | — | 1.627 | 24.5 | 98.9 | ○ |
| 17 | 108 | 1.622 | 24.2 | 94.3 | ○ |
| 18 | 13900 | 1.633 | 24.6 | 95.0 | ○ |
| 19 | 2050 | 1.627 | 24.8 | 92.8 | ○ |
| 20 | 534 | 1.628 | 24.8 | 92.3 | ○ |
| 21 | 5600 | 1.630 | 23.9 | 91.4 | ○ |
| 22 | — | 1.626 | 24.1 | 95.0 | ○ |
| 23 | — | 1.627 | 24.2 | 90.2 | ○ |
| 24 | — | 1.626 | 24.5 | 91.4 | ○ |
| 25 | — | 1.623 | 23.8 | 91.7 | ○ |
| 26 | — | 1.625 | 24.2 | 92.4 | ○ |
| 27 | — | 1.626 | 25.5 | 97.6 | ○ |
| 28 | — | 1.612 | 26.7 | 96.2 | ○ |
| 29 | — | 1.614 | 27.8 | 95.8 | ○ |
| 30 | — | 1.628 | 25.5 | 96.3 | ○ |
| 31 | — | 1.623 | 25.9 | 96.0 | ○ |
| 32 | — | 1.562 | 37.0 | 93.9 | ○ |
| 33 | — | 1.596 | 33.2 | 94.8 | ○ |
| 34 | — | 1.636 | 23.7 | 86.2 | ○ |
| 35 | — | 1.633 | 23.2 | 84.9 | ○ |
| 36 | — | 1.632 | 23.9 | 81.5 | × |
| 37 | — | 1.631 | 23.6 | 80.5 | × |

In Ex. 1 to 26 in which the compound (C) was contained, the Abbe number of the cured product was low as compared with Ex. 27 to 31 in which the compound (C) was not contained. Further, also as compared with Ex. 32 and 33 in which the monomer (A) was not contained and the monomer (F) in which the proportion (X) is less than 47 mass % was contained, the refractive index of the cured product was high, and the Abbe number was low. In Ex. 1 to 26 in which the content of the compound (C) was from 1 to 10 mass % based on 100 mass % of the total content of the monomer (A), the monomer (B) and the compound (C), the internal transmittance of the cured product was at least 90%, whereas in Ex. 34 to 37 in which it was higher than 10 mass %, the internal transmittance of the cured product was lower than 90%. Further, in Ex. 6 in which the antioxidant was added, the internal transmittance of the cured product was high as compared with Ex. 3 in which the antioxidant was not contained.

Among Examples of the present invention, the composition with the highest viscosity was that in Ex. 18 in which the content of the monomer (B) was high, and the viscosity was 13,900 mPa·s. Accordingly, with respect to the compositions without description of the viscosity among Ex. 1 to 26, the viscosity can be said to be 100,000 mPa·s or below.

INDUSTRIAL APPLICABILITY

The curable composition of the present invention is useful as a material to be used for production of an optical member (such as a lens, a prism, an antireflection film, an optical waveguide or a LED sealing material), a recording medium, a semiconductor device, etc.

This application is a continuation of PCT Application No. PCT/JP2017/034777, filed on Sep. 26, 2017, which is based upon and claims the benefit of priority from Japanese Patent Application No. 2016-189906 filed on Sep. 28, 2016. The contents of those applications are incorporated herein by reference in their entireties.

What is claimed is:

1. A curable composition, comprising:
(A) a monomer (A) having at least one crosslinkable group and at least one aromatic ring, which may have one or more sulfur atoms not constituting the ring skeleton of the aromatic ring, in which:
a total proportion of mass of atoms constituting the ring skeleton of the aromatic ring, a mass of hydrogen atoms bonded to the atoms constituting the ring skeleton of the aromatic ring, and a mass of the sulfur atom not constituting the ring skeleton of the aromatic ring, is at least 47 mass % based on 100 mass % of one monomer molecule of the monomer (A), and
a viscosity at 25° C. of the monomer (A) is at most 1,000 mPa·s;
(B) a monomer (B) represented by formula (I):

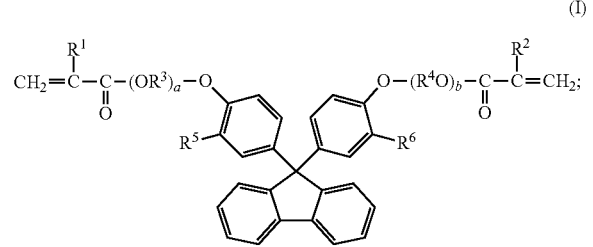

(C) a compound (C) having an Abbe number $v_D$ of at most 21 as obtained from formula (II):

$$v_D = (n_D - 1)/(n_F - n_C) \quad \text{(II)}$$

(D) a polymerization initiator (D); and
(E) an antioxidant (E), wherein:
a content of the compound (C) is from 1 to 10 mass % based on 100 mass % of a total content of the monomer (A), the monomer (B) and the compound (C);
the monomer (A) is different than the monomer (B);
the monomer (C) is different than the monomer (A);
an addition amount of the antioxidant (E) is from 0.01 to 10 parts by mass based on 100 parts by mass of the total content of the monomer (A), the monomer (B) and the compound (C);
$R^1$ and $R^2$ are each independently a hydrogen atom or a methyl group;
$R^3$ and $R^4$ are each independently at least one member selected from the group consisting of —CH$_2$—, —CH$_2$CH$_2$—, —CH$_2$CH(CH$_3$)—, —CH$_2$CH$_2$CH$_2$—, —CH$_2$CH(OH)CH$_2$—, —CH$_2$CH(CH$_2$OH)CH$_2$— and —CH$_2$CH(OR$^7$)CH$_2$—, wherein $R^7$ is a (meth)acryloyl group;
$R^5$ and $R^6$ are each independently a hydrogen atom or an alkyl group;
a and b are an integer of from 0 to 4, such that a+b is an integer of from 0 to 4;
$n_D$ is a refractive index to light having a wavelength of 589 nm at 25° C.;
$n_F$ is a refractive index to light having a wavelength of 486 nm at 25° C.; and
$n_C$ is a refractive index to light having a wavelength of 656 nm at 25° C.

2. The curable composition according to claim 1, wherein the monomer (A) is at least one selected from the group consisting of o-phenylbenzyl (meth)acrylate, m-phenylbenzyl (meth)acrylate, 2-(o-phenylphenoxy)ethyl (meth)acrylate, 2-(m-phenylphenoxy)ethyl (meth)acrylate, o-phenoxybenzyl (meth)acrylate, m-phenoxybenzyl (meth)acrylate, 1-naphthylmethyl (meth)acrylate, 2-naphthylmethyl (meth)acrylate, phenyl vinyl sulfide, phenyl vinyl sulfoxide, benzylthio (meth)acrylate, dimethyl naphthyl vinylsilane, (bis (4-methacryloylphenyl) sulfide, 2-(phenylthio)ethylthio (meth)acrylate, bis[4-(meth)acryloyloxyethylthio)phenyl] sulfide and bis[m-(2-(meth)acryloyl ethoxy)phenoxy] diphenylsilane.

3. The curable composition according to claim 1, wherein the compound (C) is at least one member selected from the group consisting of bis(4-(meth) acryloylthio phenyl) sulfide, 9-vinylcarbazole, 1-vinylnaphthalene, 2-vinylnaphthalene, 2-(9-carbazoyl) ethyl (meth)acrylate, bis(4-vinylthiophenyl) sulfide, acenaphthylene, 9-phenyl carbazole, naphthalene, poly(2-vinylnaphthalene), polyacenaphthylene, poly(9-vinyl carbazole), 4-(2-naphthalenylthio)benzyl acrylate, 2-(2-naphthalenylthio)benzyl acrylate, 5-(2-naphthalenylthio)furfuryl acrylate, 4-(2-benzoxazolylthio)benzyl acrylate, 2-(4-(2-benzo thiazolylthio)phenoxy)ethyl acrylate and a polycarbonate having a naphthalene structure.

4. The curable composition according to claim 1, wherein a content of the monomer (A) is from 4 to 90 mass % based on 100 mass % of the total content of the monomer (A), the monomer (B) and the compound (C).

5. The curable composition according to claim 1, wherein a content of the monomer (B) is from 3 to 89 mass % based on 100 mass % of the total content of the monomer (A), the monomer (B) and the compound (C).

6. The curable composition according to claim 1, wherein the addition amount of the antioxidant (E) is from 0.10 to 10 parts by mass based on 100 parts by mass of the total content of the monomer (A), the monomer (B) and the compound (C).

7. The curable composition according to claim 1, further comprising: contains
   (F) a monomer (F) which is a compound having at least one (meth)acryloyl group, and excluding the monomer (A), the monomer (B) and the compound (C).

8. The curable composition according to claim 1, further comprising:
   (F) a monomer (F) which is a compound having at least one (meth)acryloyl group, and excluding the monomer (A), the monomer (B) and the compound (C).

9. The curable composition according to claim 7, wherein a content of the monomer (F) is from 0 to 5 parts by mass based on 100 parts by mass of the total content of the monomer (A), the monomer (B) and the compound (C).

10. The curable composition according to claim 8, further comprising:
    a solvent in which the monomers (A), (B) and (F), the compound (C), the antioxidant (E), and the polymerization initiator (D) are soluble.

11. The curable composition according to claim 1, which has a viscosity at 25° C. of at most 100,000 mPa·s.

12. A cured product which is formed by curing the curable composition of claim 1.

13. The cured product according to claim 12, which has an Abbe number of at most 25 as obtained from the formula (II), and has an internal transmittance for light having a wavelength of 400 nm per 1 mm thickness of at least 90%.

14. The cured product according to claim 12, which has a refractive index to light having a wavelength of 589 nm of at least 1.60.

* * * * *